United States Patent [19]

Mulholland

[11] 4,429,643
[45] Feb. 7, 1984

[54] APPARATUS AND METHOD FOR TREATING SEWAGE SLUDGE

[75] Inventor: John H. Mulholland, Bramalea, Canada

[73] Assignee: 456577 Ontario Limited, Toronto, Canada

[21] Appl. No.: 272,998

[22] Filed: Jun. 12, 1981

[30] Foreign Application Priority Data

Jun. 30, 1980 [CA] Canada .................................. 355114

[51] Int. Cl.³ .............................................. F23G 7/04
[52] U.S. Cl. .................... 110/238; 110/215; 110/216; 110/221; 110/222; 110/224; 110/346
[58] Field of Search ............... 110/238, 224, 226, 227, 110/228, 346, 221, 222, 215, 216

[56] References Cited

U.S. PATENT DOCUMENTS

| | | | |
|---|---|---|---|
| 2,188,847 | 1/1940 | Streander | 210/603 |
| 3,521,581 | 7/1970 | Quesnel | 110/226 |
| 4,159,682 | 7/1979 | Fitch et al. | 110/346 |
| 4,311,103 | 1/1982 | Hirose | 110/224 |

FOREIGN PATENT DOCUMENTS 55-43368  3/1980  Japan .................................. 110/238

*Primary Examiner*—Edward G. Favors
*Assistant Examiner*—Steven E. Warner

[57] ABSTRACT

Sludge is dried in a dryer and burned in a furnace, the dryer being heated by heat from the furnace using a heat exchanger so that contaminants from furnace hot gas do not pass into the dryer. Gas given off from the dryer is in part mixed with fresh air and circulated back to the dryer, and is in part delivered to the furnace for combustion, being first cooled to reduce its moisture content. Gas from the furnace is also treated to remove solids, and is cooled. Water used as coolant is heated by the gases and used for anaerobic digestion of sludge, producing gas for combustion in the furnace. Dry sludge from the dryer is broken up and mixed with wet sludge entering the dryer to obtain desired sludge grain sizes.

10 Claims, 4 Drawing Figures

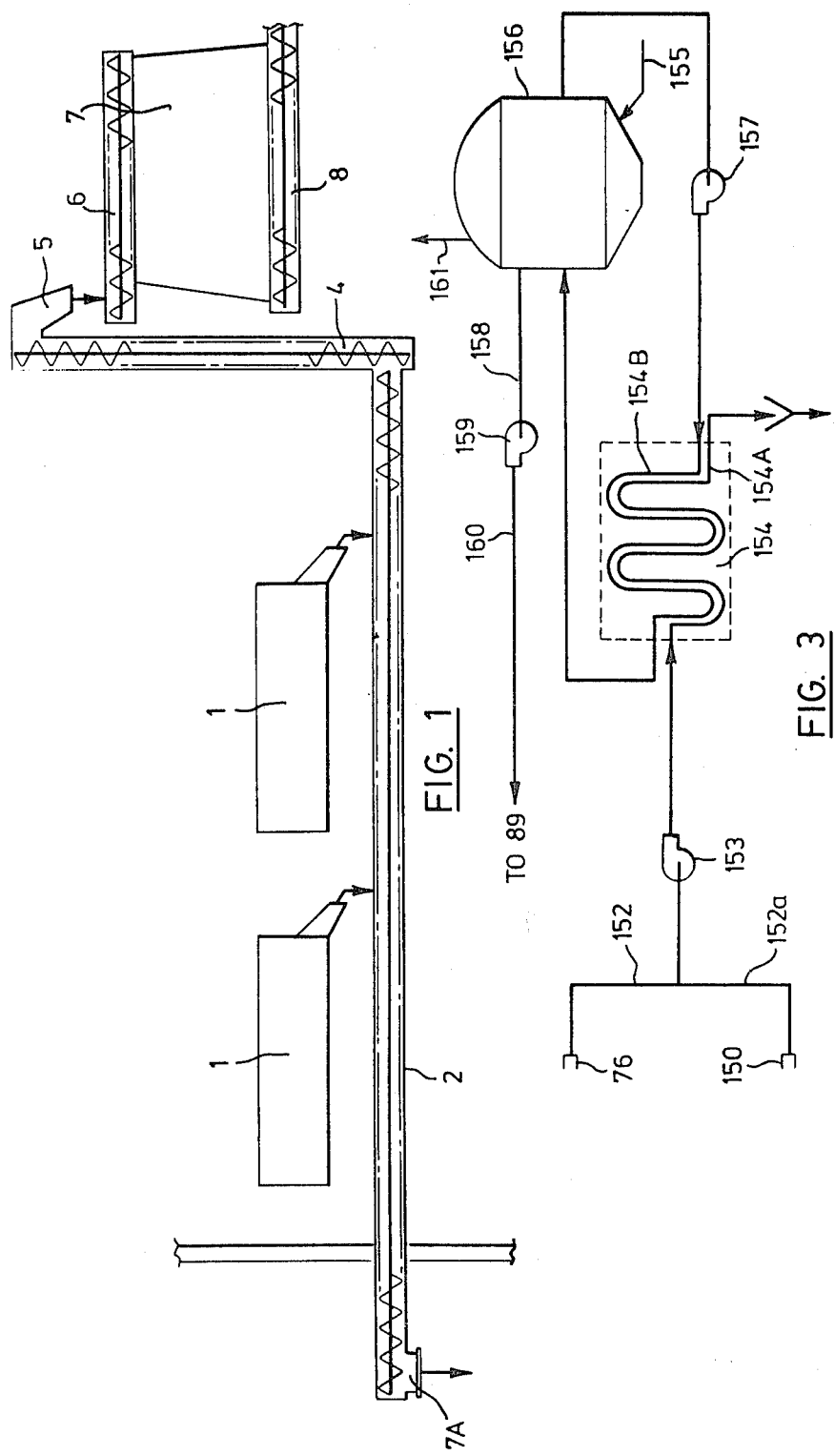

APPARATUS AND METHOD FOR TREATING SEWAGE SLUDGE

The present invention relates to an apparatus and process for treating manure mud or sludge, and more particularly sewage sludge. In this apparatus, sludge is usually mechanically dewatered and transported to a dryer. The sludge is dried to a moisture content which will enable it to be burned in a furnace.

In order to properly burn the sludge, the grain size of the dried sludge must be controlled. One such method is described in U.S. Pat. No. 4,040,190 granted to Adriaan Van den Broek on Aug. 9, 1977. In this method, the grain size of the sludge to be burned is controlled by taking a portion of the dried sludge and mixing it with the wet sludge entering the dryer. If the dried sludge has not dried to the desired size it is first broken to the desired size before introduction into the dryer. The wet sludge congeals around the granular dried sludge introduced into the dryer and dries to a grain size which can be calculated from the grain size of the dried sludge reintroduced into the dryer with the wet sludge. This grain size is matched to the furnace which is to burn the dried sludge.

In general, in sludge treatment apparatus of this type, the dryer is of a size and length to dry the sludge to at least the minimum moisture content which can be adequately burned in the furnace. Of course, under normal circumstances, the wet sludge has been mechanically dewatered prior to its introduction into the dryer.

The dried sludge from the dryer is burned as fuel in the furnace which produces hot gas for recirculation directly through the dryer to dry the wet sludge.

Normally the sludge treatment apparatus is designed so that it can recirculate and burn all of the dried sludge as fuel in which case the ash produced by the burning process can be transported to a land fill or other disposal site, or it is designed to recirculate only part of the dried sludge as fuel and use the balance to produce a dried granular end product which can be spread on to fields and used as manure or soil conditioner.

If the starting product, such as sewage sludge, has been excessively contaminated with metal components then the end product will normally be unsuitable as manure or soil conditioner in agricultural uses due to environmental and health considerations. In that case, the sludge treatment plant is normally operated in such a way so as to burn all of the dried sewage as fuel for the drying furnace, or land fill facilities must be provided to dispose of the excess product.

In many cases, the starting sewage sludge does not have so high a proportion of contaminants that it cannot be used to produce a manure or soil conditioner. However, the prior art drying process described above can increase the percentage concentration of metal components or other detrimental substances and thereby render the end product useless as manure or soil conditioner. This occurs when the dried sludge is used as fuel for the drying furnace. When the end product of the drying operation, containing heavy metal components or other detrimental substances, is burned to provide the energy source to heat the gas which is circulated directly through the drying drum as hot gas to dry the sludge, the circulated gas may contain and deposit metal components or other detrimental substances onto the sludge being dried and thereby increase the percentage of these detrimental substances in the dried sludge end product. Gas in this context means substances in the gaseous phase and includes air and vapour.

In addition, when the heated gas produced by the burned sludge end product or other fuel is introduced directly into the dryer, it is possible that excessive inert material such as ash may be concentrated into the sludge end product. This sometimes makes the sludge more difficult to burn.

Sewage treatment plants of the type disclosed in U.S. Pat. No. 4,040,190 also produce discharge gas given off during the drying process. Prior art plants recycle part of this dryer discharge gas by mixing it with the hot gas produced by the burning fuel and passing these mixed gases back through the dryer to dry the sludge. Only part is recycled because of the need to introduce a substantial amount of outside air due to the moisture content of the discharge gas.

In the prior art, dryer discharge gas is passed through a scrubber and released into the environment, but this still often results in the substantial emission of undesirable and noxious odors into the environment. In addition, the waste heat drawn off by the scrubber is not used.

Dryer discharge gas, as used in the present specification, refers to the gas exiting from the drying sludge. It includes everything gaseous exiting from the dryer and is normally composed of a mixture of hydrocarbon emissions given off in the drying process, water vapour and air used to dry the sludge.

In one aspect of this invention, the hot furnace gas produced in the burning of the dried sludge is kept separate from the gas to be used to dry the wet sludge in the dryer. The hot gas produced in the furnace is passed through a heat exchanger where it is used to heat part of the dryer discharge gases given off during the drying process and outside air to be mixed with the dryer discharge gas. Neither the dryer discharge gas or air usually contains substances which will be deposited on the sludge, and they are passed through the dryer to dry the wet sludge. Thus if the sludge which is to be used as a fuel (or if other fuel used to dry the sludge) contains heavy metal or other detrimental substances likely to be deposited on the sludge, there will not normally be a reconcentration of these substances in the dried sludge end product.

The other part of the dryer discharge gas containing noxious and odorous gas and pollutants which it is undesirable to release into the atmosphere is delivered into the furnace as combustion gas. None of the dryer discharge gas passes directly into the environment. Part of the dryer discharge gas may be recycled through the dryer as previously mentioned and part or all is used in the combustion furnace. The noxious and odorous gas given off by the drying sludge and contained in the dryer discharge gas is mixed with outside air and used as combustion gas in the furnace. During this process this noxious and odorous gas is reheated to a high temperature in the combustion furnace and oxidized. The oxidation produces some ashes and solid by-products, and in combination with a scrubber for gas exiting from the furnace to the atmosphere substantially reduces noxious or odorous emissions from the plant.

A prior difficulty in using dryer discharge gas as combustion gas has been that the moisture content of the discharge gas released from the drying process must be adjusted and adapted to the moisture and heat content of the combustion gas required by the drying furnace which is burning the dried sewage as fuel. In one aspect of the present invention, there is provided a means for lowering the adiabatic saturation temperature of the dryer discharge gas thereby reducing its moisture content and thus allowing the gas to be used as combustion gas in the furnace. In the preferred embodiment, this means is a water scrubber.

The use of the scrubber also makes it possible to recover some of the heat contained in the gas given off during the drying process by collecting that heat in the scrubber water. The recovered heat collected from the discharges emanating from the drying of wet sludge can be used in a related process such an anaerobic digestion of sewage sludges.

The water used in the scrubber will generally be raised to a temperature of approximately 60° C. This temperature is usually sufficient for anaerobic digestion.

If anaerobic digestion is used, it will usually produce a combustible gas as a by-product of its process and this gas can be used as a fuel in combination with the dried sludge in the present invention should the dried sludge produced from the drying process not have sufficient energy value alone to dry the incoming wet sludge so that the latter when dried can be used as fuel.

As previously stated, in at least one aspect of the invention, the combustion furnace burns the dried sludge and uses some of the dryer discharge gas given off during the drying process as part of the combustion gas. The combustion furnace discharges hot gas which is passed through a heat exchanger. The heat exchanger keeps separate the contaminated furnace gas from the gas (air and recirculated dryer discharge gas) used to dry the sludge and heats up the latter gas for use in the dryer. In the process, the heat exchanger cools down the hot gas which emanates from the combustion furnace. This cooling allows for the precipitation out as ash of a portion of the undesirable by-products, by-products which might not otherwise be caught by a scrubber. Further undesirable by-products can be removed by the use of a water scrubber.

Thus dryer discharge gas given off during the drying of the sludge can be cooled in one water scrubber to produce gas of a moisture content for use as combustion gas in the furnace, and the furnace discharge gas emanating from the combustion furnace can be cooled in another water scrubber. The water in the second scrubber is heated, as in the first mentioned scrubber, to a temperature of approximately 60° C. This heated water can be drawn off and used for heating other related process, for example, anaerobic digestion, as was the case with the first mentioned scrubber, and the anaerobic digestion can produce gas which can be used to fuel the furnace.

Whether or not this whole operation, once started, can be carried on without the use of additional fossil fuels—that is using only the dried sludge or dried sludge and anaerobic digestion gas by-products as fuel—depends upon the water content of the mechanically dewatered sewage sludge entering the dryer.

The calorific value of the combustible materials in a sludge which can be mechanically dewatered to about 80% moisture content is usually sufficient to produce a drying of the sewage sludge to a minimum moisture level so that it in turn can be burned in the furnace to in turn dry more sludge for use as fuel in a self-sustaining process. Sometimes there may be needed the digester gas which can be produced in a related anaerobic process by use of the heated scrubber water. Where the moisture content of the mechanically dewatered sludge is about 80% or more, all of the dried sludge will normally be needed as fuel, and no end product will be produced.

However when the mechanically dewatered sludge contains less than approximately 80% moisture, then the combustible material produced by the process usually has a calorific value when taken alone or in conjunction with the gas produced by the related anaerobic sludge digestion process to dry the incoming wet sludge and produce an excess of dried sewage sludge. That is, not all of the dried sewage sludge will be needed to fuel the furnace. There will be a dried end product which may be used as manure or soil conditioner. If the incoming sewage sludge does not contain an excessive amount of detrimental substances, then it can be used for agricultural uses, because this invention does not normally concentrate the amount of detrimental substances during the drying process.

Thus the invention in one aspect consists of a sludge treatment system which comprises:
(a) a furnace capable of burning sludge and producing heat; and
(b) a dryer capable of receiving wet sludge and removing sufficient moisture from the sludge so that it is dry enough to be burned in the furnace and in which the dryer is heated by indirect contact with the furnace heat.

In another aspect the invention consists of a system for the processing of sludge which comprises:
(a) a furnace capable of burning dry sludge and producing heat;
(b) a dryer capable of receiving wet sludge and removing sufficient moisture from the sludge so that it is dry enough to be burned in the furnace;
(c) means for transporting the dried sludge to the furnace;
(d) means for introducing at least some of the dryer discharge gas released during the drying process for combustion in the furnace.

And in yet another aspect the invention consists of a sludge treatment system including a dryer for exposing sludge to hot gases, a furnace for burning sludge from the dryer, means for heating and circulating part of the dryer discharge gas back to the dryer, means for delivering the remainder of the dryer discharge gas into the furnace for combustion therein whereby no dryer discharge gas is discharged to atmosphere without passing through the furnace.

Other aspects of the invention will become apparent from the following description when considered in conjunction with the drawings, in which:

FIG. 1 is a flow chart diagrammatically showing a dewatering device with associated sludge transport means;

FIG. 3, which is on the same page as FIG. 1, is a flow chart of an anaerobic digestive system which can be used with the apparatus shown in FIGS. 2A and 2B.

Figure 2A:
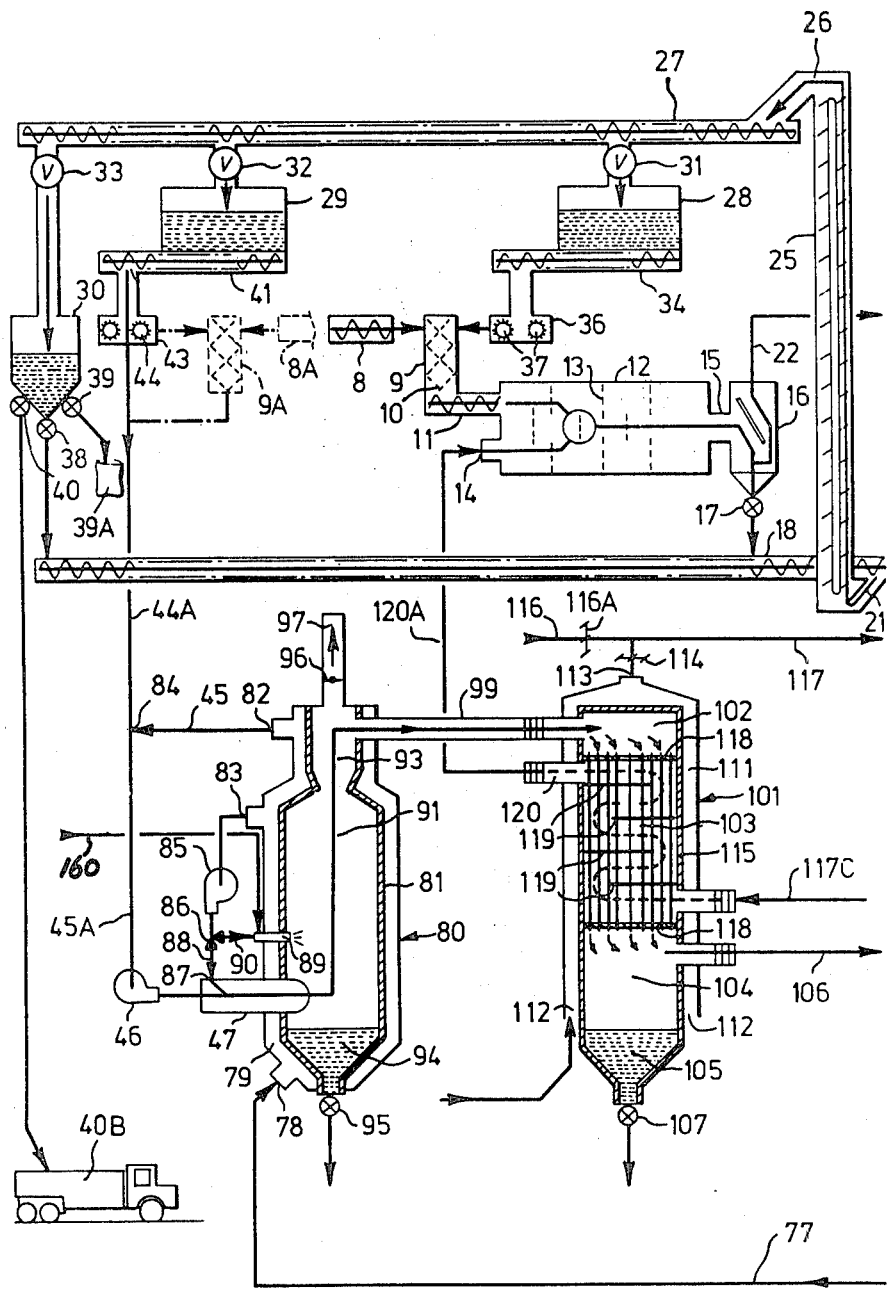
FIGS. 2A and 2B are a flow chart of sludge treatment apparatus to which the sludge is transported after leaving the dewatering device shown in FIG. 1.

In FIG. 1, sludge for example sewage sludge, is deposited on mechanical dewatering devices such as belt filter presses 1 in which a first dewatering takes place. In this way the sludge can be dewatered to about 20 to 30% dry matter or 80 to 70% moisture. A screw conveyor 2 conducts the sludge to an upwardly directed screw conveyor 4 which transports the sludge via outlet 5 and a distributor screw 6 into a wet sludge hopper 7.

The screw conveyor 2 can be rotated in the opposite direction thus discharging sludge at an outlet 7A permitting the sludge to be removed from the system if necessary at this point in the processing.

Figure 2B:
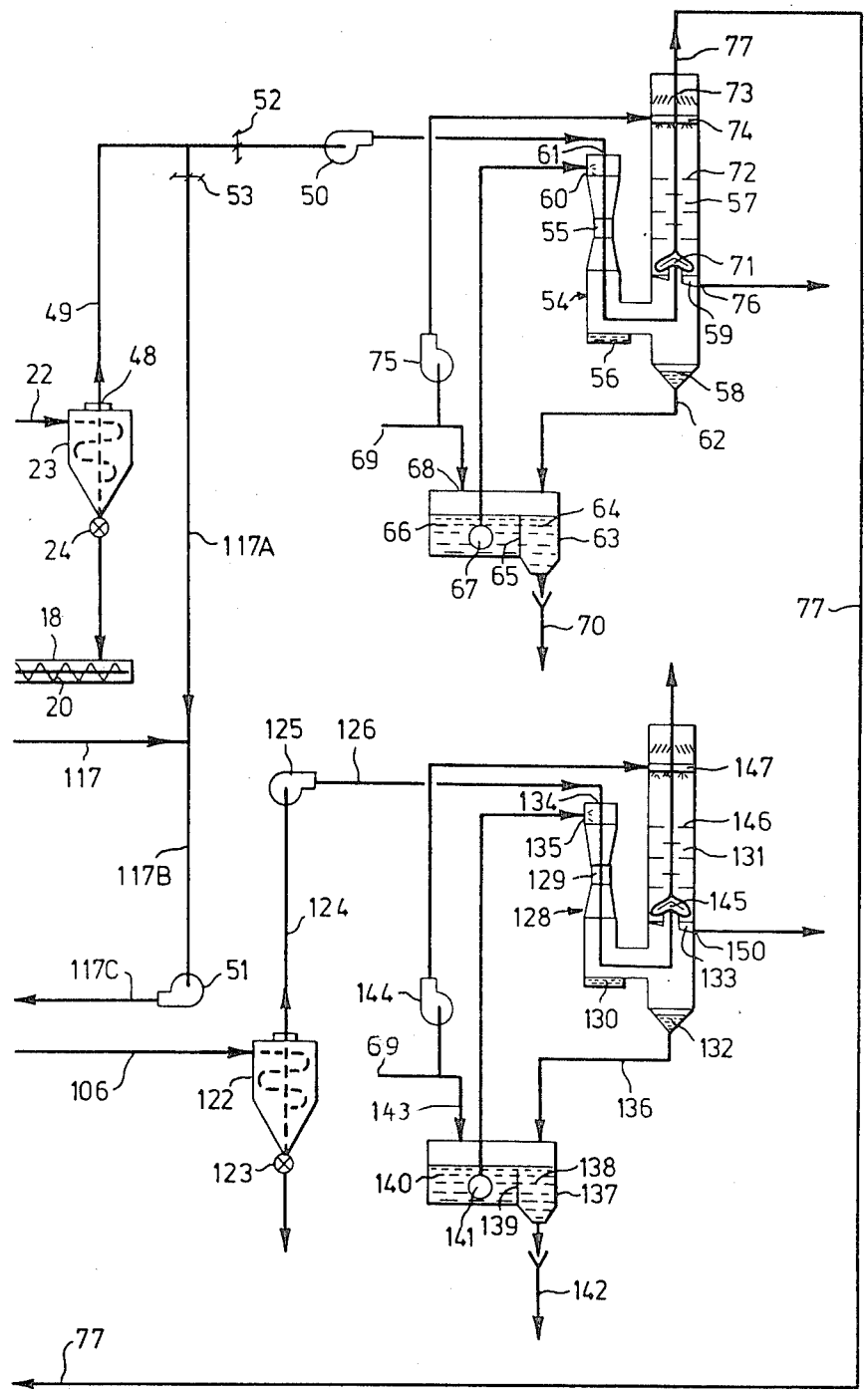

In FIG. 2A, a dosing screw 8 conducts the sludge from the hopper 7 (shown in FIG. 1) to a conventional mixer 9 operating with counter rotating screws (not shown). From here the sludge is further conducted from outlet 10 to a feeding screw 11 pushing the sludge into a cylindrical rotary drying drum 12. The drying drum 12 is of a conventional design. The sludge is forced by means of baffles 13 to follow a zig-zag path through the drying drum. Hot gases are blown into the drying drum through duct inlet 14. The hot dried sludge proceeds via outlet 15 into a knock-out box 16 in which the gas and lighter dried sludge product grains are separated from the heavier dried sludge product grains. The heavier grains are transferred from the knock-out box via a dried product valve 17 to a collector screw conveyor 18. The conveyor includes a screw 20 which conveys the heavier dried product grains to discharge outlet 21. The gas and the lighter dried sludge product grains are conveyed from the knock-out box 16 via a duct 22, also indicated in FIG. 2B, to a cyclone battery 23 wherein the gas is separated from the lighter dried sludge product grains, the latter being transferred via a dried product valve 24 and screw 20 to the discharge outlet 21 (FIG. 2A). From the discharge outlet 21 the dried sludge product falls into an elevating conveyor 25, for example, a bucket elevator, conducting the dried sludge product upwardly to its discharge outlet 26 from which the dried sludge product passes to a storage conveyor 27 which conveys the dried sludge product to dried product bunkers 28, 29 and 30 depending upon the position of valves 31 and 32. Thus if the valve 31 is in the open position the dried product will deposit into bunker 28. If the valve 31 is in the closed position and the valve 32 is in the open position the dried product will be deposited into bunker 29. If valve 31 and 32 are both closed the dried product will be conducted via permanently open valve 33 to bunker 30.

Dried product bunker 28 has an open bottom through which the dried sludge product passes to a dosing screw 34 which may be equipped with a variable speed drive by which the amount of the dried sludge product delivers to a grain crusher 36 can be controlled. The dried product passes through the grain crusher 36 which is provided with coacting rollers 37. The space between the rollers can be adjusted to control the granular size of the dried sludge product.

A portion of the dried sludge product is mixed in mixer 9 with wet sludge conveyed from the wet sludge hopper 7. The dried sludge product and wet sludge are mixed in proportion to the moisture content of the starting material being conveyed from the wet sludge hopper 7. If the moisture content of the wet sludge after mechanical dewatering is approximately 80% moisture and the moisture content of the dried product needed is approximately 5% moisture, then the wet sludge and dried sludge product will have to be mixed roughly in the proportion of 3:2. This is to produce a moisture content of approximately 50% for the wet sludge entering the drying drum 12 via screw 11.

The coacting rollers 37 may be adjusted to produce a grain size which will result in a dried sludge emanating from the dryer 12 of a proper grain size to be burned in the furnace to be described later. If the clearance between the coacting rollers is set to produce a grain size of approximately 1.2–1.8 mm, when this dried product is mixed with the wet sludge in the mixer 9 and introduced into the dryer 12, the dried sludge product produced will have a grain size of approximately 2–3 mm. This grain size is suitable for use in, for example, solid fuel furnaces sold by Waycot Systems Limited of Vancouver, British Columbia.

Dried product bunker 30 can receive a portion of the dried sludge product transported via storage screw 27. This bunker has sloping sides and a dried product valve 38 for transferring the dried sludge product via screw 18 to the other dried product bunkers 28 or 29 as required. At the bottom of dried product bunker 30 is a device for optimally filling bags 39A from dried product valve 39 and for filling trucks 40B from dried product valve 40.

Storage bunker 29 is similar in design to storage bunker 28. Dried sludge can be passed via dosing screw 41 into grain crusher 43 having coacting rollers 44 and thence via ducts 44A and 45A and from blower 46 to a solid fuel burner 47 of furnace 80 where this portion of the dried sludge is burned. Dosing screw 41 may have a variable speed drive to control the amount and rate of flow of dried sludge to match the burning rate of the solid fuel burner 47. The crusher 43 can provide a grain size suited to various burners, such as those sold under the trade mark Lamb-Cargate, Wet Cell Burner, or trade mark, Coen DAS (Dual Air Zone) Scroll Feed Burner; these may require a different grain size than that preferred for a dried sludge end product to be used as manure or soil conditioner.

If the sludge is dried to a moisture content which is drier than that needed in the furnace, then (as indicated in broken lines in FIG. 2A) wet sludge from hopper 7 can be introduced by alternate dosing screw 8A into alternate mixer 9A where it is mixed with dried sludge from bunker 29, and the combined product is passed to the furnace.

The distribution of dried sludge between bunkers 28, 29 and 30 will depend upon the moisture content of the sludge entering the system after being mechanically dewatered, on the ability of the drying drum to eliminate sludge moisture and on the need to produce a dried end product. In a typical case, at least about 75% of the dried sludge product must be reintroduced via bunker 28 into the mixer 9 to be mixed with wet sludge in order to produce dried sludge product of the proper granular size; more than this percentage of dried sludge must be reintroduced if the moisture content of the mechanically dewatered wet sludge entering the mixer 9 is greater than 80%. The amount recycled through the drying drum 12 could be as high as 95%.

The recycled amount is not lost to the process. The dried sludge is ultimately consumed either as fuel in the furnace via burner 47 or it is tansported from the process at 39A and 40B to be used as manure or soil conditioner.

The dryer discharge gas drawn from the cyclone battery via duct collar connection 48 and through a duct 49 via an induced draft fan 50, but regulating dampers 52 and 53 are set to recycle a portion of the gas via primary air fan 51 into a heat exchanger 101 (FIG. 2A) and thence back into the dryer 12. The dryer discharge gas emanating from the dryer contains a large amount of heat. The portion of the hot gas recycled via fan 51 to the drying drum 12 is mixed with fresh air (entering the system at 112 as described later) depending on the combined moisture content and drying ability of the recirculated gas and the fresh air.

The balance of the dryer discharge gas emanating from the dryer, and containing noxious and odorous hydrocarbons or pollutants, is circulated via fan 50 into a venturi scrubber 54 which consists of a wetted venturi throat 55, flooded elbow 56, cooling tower 57, lower sump 58 and upper sump tray 59. Water under pressure enters the venturi water inlet 60 where it mixes with the gas. The hot gas entering the venturi 61 causes a portion of the water to evaporate as the gas passes through the throat 55 and the mixture of gas and water vapour comes to a common temperature. As the gas cools, it absorbs the evaporated water, saturating the gas at the common temperature of the gas and water vapour. Excess water not evaporated separates out from the gas and water vapour in the flooded elbow 56 and spills over into the lower sump 58. This water has been heated by the contact with the gas emitted from the dryer and is withdrawn via pipe 62 into a clarifying container 63 wherein finely dispersed dried product that did not separate out from the gases in the knock-out box 16 and cyclone battery 23 may settle out in chamber 64 for removal from the system via drain 70. The water after separation from the finely dispersed dried product flows over a weir 65 or other suitable barrier into an outlet chamber 66 and is pumped from the outlet chamber 66 via pump 67 back into the venturi water inlet 60 for reuse. A separate inlet 68 from a clear water source 69 provides water to replace that evaporated in the wetted venturi 55 and lost in withdrawal of dried product via drain 70.

Referring again to the venturi scrubber 54, the gas separated from the water in the flooded elbow 56 passes through a covered opening 71 in the upper sump tray 59 and rises up through perforated trays 72. Water is sprayed into the top 73 of cooling tower 57 through a spray header 74. This water may be supplid from the clear water source 69 via a pump 75 to increase the pressure at the spray header. The water sprays down through the rising gas, thus cooling it and condensing water vapour out of the gas which can no longer hold the same quantity of water vapour as at its former higher temperature. The water sprayed down is collected in the upper sump 59 and will have a temperature which is dependent upon the quantity of water used, its initial temperature, and the temperature of the gas at the covered opening 71 and the top of the tower 73. The temperature of the water in the upper sump tray 59 will not normally be lower than about 10°-20° C. below the temperature of the gas entering at the covered opening 71. Thus the water is typically heated to a temperature of about 60° C. This heated water can be drawn off at the upper sump drain connection 76, and can be used to provide heat for anaerobic digestion to be discussed later.

The dryer discharge gas exhausting from the tower 73 passes via duct 77 to the furnace 80. It is cooled in the tower 73 so as to eliminate as much water vapour as is necessary for proper operation of the solid fuel turbulator and burner 47. With a Waycot Systems Limited combustion furnace, normally the gas should be cooled to a temperature of approximately 35° C.

The cooled dryer discharge gas conducted through duct 77 enters an inlet 78 of a plenum 79 surrounding the solid fuel furnace 80. The gas absorbs heat lost through the furnace wall 81 and is reheated, thus increasing its capacity to absorb water vapour. The gas acts as combustion gas for the solid fuel turbulator and burner 47.

The gas leaves the plenum 79 at exhaust openings 82 and 83. Part of the reheated gas is drawn out of the plenum 79 at exhaust opening 82 to pass via ducts 45 and 45A and fan 46 into the solid fuel turbulator and burner 47. The rate at which the gas is drawn off at plenum exhaust 82 depends upon the capacity of fan 46 which is set to supply the proper amount of combustion gas to the solid fuel turbulator and burner 47 depending upon the burner's firing rate.

The remaining portion of the reheated dryer discharge gas, not drawn off at plenum exhaust opening 82, is drawn out, at exhaust opening 83 through fan 85. Proportioning valve 86 sends part of this reheated gas into the solid fuel turbulator and burner 47 via duct 88 and port 87. The valve 86 directs a further part of the reheated gas via duct 90 into an auxiliary fuel burner 89.

The proportioning valve 86 is set in accordance with the firing rates of the solid fuel turbulator and burner 47 and the auxiliary burner 89 but should provide not less than the minimum gas requirements for complete combustion of the dried granular product or auxiliary fuel, for example fossil fuel or anaerobic digester gas produced in a related process. The gas which, it will be recalled, includes the discharge gas or gaseous hydrocarbon by-products given off during the sludge drying process and circulated via venturi scrubber 54, and the dried sludge granular product blown into the solid fuel turbulator and burner via ducts 44A and 45A, are thoroughly intermixed and combusted within the burner 47 and the furnace chamber 91. Within the furnace chamber 91 the combustion takes place at an average temperature of approximately 850°-900° C. The gas and dried granular product remain within the furnace chamber 91 for approximately 3 to 5 seconds. This temperature and length of time is usually sufficient for complete combustion of the dried sludge product and complete oxidation of the gaseous hydrocarbons. After combustion, non-harmful combustion products, e.g. carbon dioxide, nitrogen and water vapour remain along with certain oxidized pollutants such as the sulfur oxides and the nitrogen oxides. In addition the heat generated in the furnace will normally kill most bacteria and pathogens.

The combustion products leave the furnace chamber 91 via an exhaust chamber 93. The non-combustible portion of the dried product which is not conveyed upward through the furnace chamber 91 falls to the furnace chamber ash pit 94 from which it can be removed via the ash pit valve 95 for disposal as permitted by government regulations.

The furnace 80 is also equipped with a dump valve 96 and discharge vent duct 97 to relieve the furnace 80 in the event of combustion malfunction.

The furnace 80, with its associated burners and ancillary equipment as described, is one of a number of known available furnaces capable of burning dried granular sludge.

The combustion products (furnace discharge gas) exit from the furnace 80 via a duct 99 into heat exchanger 101 which includes an inlet plenum 102, tubes 103, which are set into or attached to tube sheets 118, an outlet plenum 104 and an ash bottom 105. The combustion products move quickly through the tubes 103 and are cooled to a temperature of approximately 250°-350° C. As the combustion products change direction and slow down in the outlet plenum 104 in order to exit via duct 106, part of the non-combustible dried product separates out from the combustion products and falls into the ash bottom 105 to be withdrawn via the ash bottom valve 107 for disposal as permitted by government regulations.

In the heat exchanger 101 the combustion products passing through the tubes 103 (the tube side of the exchanger) are separated from, and heat, gas which enters the shell side of the exchanger from duct 117C (connected to fan 51 in FIG. 2B) and leaves the exchanger through exit 120 and duct 120A to enter the dryer 12 at inlet 14 to dry the wet sludge. The flow of gas to be heated in the heat exchanger will now be described. This gas is a combination of recycled dryer discharge gas and fresh air. As previously described, dryer discharge gas, the amount of which is controlled by damper 53, is delivered via ducts 117A, 117B and 117C to the heat exchanger. This dryer discharge gas will include hot air and hydrocarbon by-products and water vapour given off during the drying process. The amount used will in part be dependent on its moisture content. In the heat exchanger 101, fresh air enters the bottom of the outer plenum 111 at 112 and exits from the top of the outer plenum at 113. The quantity of fresh air admitted is controlled by damper 114. By passing through the outer plenum, the fresh air is heated by contact with the walls 115 of the heat exchanger. Fresh air may also be introduced through duct 116 and damper 116A without passing through the outer plenum 111. The fresh air is drawn by fan 51 through duct 117 and is mixed with recycled dryer discharge gas from duct 117A, passes through blower 51 and enters the heat exchanger through duct 117C.

The mixture of recycled dryer discharge gas and fresh air is blown into the shell side of the heat exchanger 101 via duct 117C. This moisture which is to be used for drying is separated from the furnace discharge gas which is contained in tubes 103 and because of the tube sheets 118 cannot intermix with the furnace discharge gas. The mixture follows a zig-zag course due to baffles 119 as it is heated in the exchanger.

The amount of recycled dryer discharge gas versus fresh air, the rate of firing of the furnace and the speed with which the recycled dryer discharge gas and fresh air passes through the heat exchanger all contribute to determining the temperature and water vapour content of the hot gas entering the dryer. The temperature of the dryer discharge gas recycled should be less than the ignition temperature of the material being dried, to prevent fires. Normally this would be less than 500° C. These are adjusted so that the hot gas can properly dry the wet sludge to the desired state of moisture. This desired state will generally be a moisture content of approximately 5–15% water depending on the maximum water content to be contained in the dried sludge product. If the dried sludge product is mixed with wet sludge and the combined product contains no more moisture than approximately 50%, it can normally be effectively burned in the combustion furnace used: as previously described, wet sludge may be supplied to the furnace via alternate mixer 9A, as an alternative to burning dried sludge alone.

The cooled combustion gas exiting from the heat exchanger 101 is conveyed via duct 106 to a cyclone separator 112. Non-combustible solid particles which have not been separated out in furnace ash pit 94 or heat exchanger ash bottom 105 are precipitated out in the cyclone 122 and can be removed through dry ash valve 123 for disposal with the other ash by-products. Combustion gas exits from the top of the cyclone 122 via duct 124, fan 125 and duct 126 and enters a venturi scrubber 128 similar in design to scrubber 54. Thus the scrubber consists of a wetted venturi throat 129, a flooded elbow 130, a cooling tower 131, a lower sump 132 and an upper sump tray 133. The combustion gas enters the venturi scrubber at 134 and water enters at 135. Further solid non-combustible products in the combustion gas are collected in lower sump 132 and drawn off via pipe 136 into clarifying container 137 which contains an inlet chamber 138 a weir 139 and an outlet chamber 140. The settled solid products are drawn off via drain 142 and clear water is supplied from a clear water source 69 to the clarifying container at 143. The scrubber 128 works in the same way as scrubber 54 and thus also has a covered opening 145, perforated trays 146 and a spray header 147 supplied with clear water from a pump 144. Water which cools the combustion gas exiting from the scrubber is warmed and collected in the upper and lower sump trays 133 and 132. Water from tray 133 can be drawn off via drain 150 for other related processes, such as anaerobic digestion in conjunction with the heated water drawn off from scrubber 54.

In the case of scrubber 128, unlike scrubber 54, the hot gas is exhausted directly into the atmosphere via a stack (not shown). Therefore, the gas is usually cooled to a temperature necessary to reduce the visual plume produced by water vapour emanating from the stack and to minimize the total quantity of water vapour discharging into the atmosphere and likely to condense upon contact with the ambient air.

The water passing through the venturi scrubbers eliminates some of the oxidized pollutants contained in the gas. Thus some of the sulfur oxides and nitrogen oxides will become dissolved in the water used in the scrubbers and can be disposed of in the water. The gaseous pollutants and uncombusted solid products remaining in the exhaust gas can normally be held within present acceptable limits.

Heated water collected in the upper sump trays 59 and 133 is drawn off at drains 76 and 150. In FIG. 3 is illustrated a typical anaerobic digester circuit. The hot water from drain 76 and 150 runs through pipes 152 and 152A and pump 153 into pipes 154A in a heat exchanger 154. Raw liquid sludge enters anaerobic digester 156 from a raw sludge source at 155 and is circulated by a pump 157 through a matching set of pipes 154B in the heat exchanger and is thus warmed without contact with the heated water. The liquid sludge is circulated through the heat exchanger so as to maintain as near as possible an average temperature of 35° C. for the sewage sludge in the anaerobic digester. As the digestion proceeds, methane, hydrogen, hydrogen sulphide, water vapour, carbon dioxide and other gases are released. These can be drawn off from digester 156 via pipe 158, booster blower 159 and pipe 160 to the auxiliary fuel burner 89 for combustion in the solid fuel furnace 80. Digested sludge is continuously drawn off at 161 and can be deposited on belt presses 1 for drying in the system just described or can be disposed of in some other way. In those cases where it is possible to operate the plant, once started, completely by burning dried sludge and the digester gas given off during the anaerobic digester process, then it may not always be possible to produce a dried end product to be used as manure or soil conditioner. If the wet sludge cannot be mechanically dewatered less than 80% moisture, then generally the apparatus and process described will produce a sufficient amount of dried sludge to be used as fuel but will not produce a dried sludge end product as previously described.

From the foregoing description it will be seen that there is provided a sludge treatment system which includes means 1 for dewatering the sludge, a rotary dryer 12 for exposing dewatered sludge to hot gas, a furnace 80 for burning sludge from the dryer, means 9 for mixing part of the sludge from the dryer with dewatered sludge supplied to the dryer, a first cyclone 23 for separating solids from dryer discharge gas, means for heating and circulating part of the dryer discharge gas back to the dryer, including a heat exchanger 101 having a passage 103 for furnace discharge gas and a separate passage for the circulating dryer discharge gas whereby the latter is heated by the furnace discharge gas without exposure to contaminants thereon, means for delivering the remainder of the dryer discharge gas into the furnace for combustion therein whereby no dryer discharge gas is discharged directly to the atmosphere, a first water scrubber 54 for said remainder of dryer discharge gas delivered into the furnace 80 to reduce the moisture content of said remainder of dryer discharge gas by cooling, a second cyclone 122 for separating solids from the furnace discharge gas emanating from the heat exchanger, a second water scrubber 128 for further cleaning of the furnace discharge gas emanating from the second cyclone, an anaerobic sludge digester 156 heated by water from the scrubbers, said digester producing a gaseous fuel for use in the furnace, means for introducing fresh air into the circulating dryer discharge gas 114 and 116A, including means for heating the fresh air in the heat exchanger 101 without contact with furnace discharge gas or dryer discharge gas; means for introducing fresh air into the furnace. Modifications of the preferred embodiment illustrated will occur to those skilled in the art and are intended to be included within the following claims.

I claim:

1. A sewage sludge treatment system comprising
   (a) means for dewatering the sludge;
   (b) a rotary dryer for exposing dewatered sludge to hot gas;
   (c) a furnace for burning sludge from the dryer;
   (d) means for mixing part of the sludge from the dryer with dewatered sludge supplied to the dryer;
   (e) a first cyclone for separating solids from dryer discharge gas;
   (f) means for heating and circulating part of the dryer discharge gas back to the dryer, including a heat exchanger having a passage for furnace discharge gas and a separate passage for the circulating dryer discharge gas whereby the latter is heated by the furnace discharge gas without exposure to contaminants thereon;
   (g) means for delivering the remainder of the dryer discharge gas into the furnace for combustion therein whereby no dryer discharge gas is discharged directly to the atmosphere;
   (h) a first water scrubber for said remainder of dryer discharge gas delivered into the furnace, to reduce the moisture content of said remainder of dryer discharge gas by cooling;
   (i) a second cyclone for separating solids from the furnace discharge gas emanating from the heat exchanger;
   (j) a second water scrubber for further cleaning of the furnace discharge gas emanating from the second cyclone;
   (k) an anaerobic sludge digester heated by water from the scrubbers, and said digester producing a gaseous fuel for use in the furnace;
   (l) means for introducing fresh air into the circulating dryer discharge gas, including means for heating the fresh air in the heat exchanger without contact with furnace discharge gas;
   (m) means for introducing combustion air into the furnace.

2. A sewage sludge treatment system comprising
   (a) a dryer to dry dewatered sludge and means for heating the dryer substantially by dryer discharge gas;
   (b) means for introducing dewatered sludge to the dryer;
   (c) a furnace for burning sludge from the dryer;
   (d) means for removing dried sludge from the dryer and means for mixing part of the so removed dried sludge with dewatered sludge supplied to the dryer;
   (e) means for heating and circulating dryer discharge gas back to the dryer, including a heat exchanger having a passage for furnace discharge gas and a separate passage for the circulating dryer discharge gas whereby the latter can be heated by the furnace discharge gas without exposure to contaminants;
   (f) means for delivering dryer discharge gas into the furnace for combustion therein whereby no dryer discharge gas is discharged directly to the atmosphere;
   (g) a water scrubber for said dryer discharge gas delivered into the furnace, to reduce the moisture content of said dryer discharge gas by cooling;
   (h) means for introducing fresh air into the circulating dryer discharge gas.

3. A sludge treatment system in accordance with claim 2 in which the means for mixing part of the dried sludge removed from the dryer with dewatered sludge include means for first grinding the dried sludge to a predetermined grain size so that the sludge in the dryer dries to a predetermined grain size.

4. A sludge treatment system in accordance with claim 3 which includes means for removing the dried sludge produced by the dryer for use as fertilizer.

5. A sludge treatment system in accordance with claim 3 which further comprises a second water scrubber for further cleaning of the furnace discharge gas.

6. A sludge treatment system in accordance with claim 5 which further comprises an anaerobic sludge digester heated by water from scrubbers, and said digester producing a gaseous fuel.

7. A process for treating sludge comprising the steps of
   (a) introducing wet sludge into a dryer and drying it to produce dried sludge capable of being burned in a furnace, thereby releasing dryer discharge gas;
   (b) introducing the dried sludge into a furnace and burning it to produce furnace discharge gas;
   (c) cooling at least part of the dryer discharge gas to remove some of this moisture;
   (d) heating the dryer substantially only by the dryer discharge gases heated by indirect contact with the furnace discharge gas;
   (e) circulating at least part of the dryer discharge gas through the furnace as combustion gas;

(f) removing some of the dried sludge from the dryer;

(g) grinding some or all of the dried sludge so removed to a predetermined grain size;

(h) reintroducing some of the dried sludge so produced into the wet sludge entering the dryer so that the wet sludge dries to a predetermined grain size.

8. A process as in claim 7 including either recirculating the dryer discharge gas to the dryer or using it as combustion gas in the furnace so that no dryer discharge gas is discharged directly to the atmosphere.

9. The process of claim 7 which comprises the additional step of using the heat given off by cooling the dryer discharge gas to heat an anaerobic sludge digester.

10. The process of claim 9 or 7 in which the hot gas produced by the furnace is further cleaned and cooled by passing it through a water scrubber before discharge to the atmosphere and the heat given off by this cooling is used to heat an anaerobic sludge digester.

* * * * *